(12) United States Patent
Yashiki

(10) Patent No.: US 6,894,798 B2
(45) Date of Patent: May 17, 2005

(54) INTERNET FACSIMILE SYSTEM

(75) Inventor: Satoshi Yashiki, Yokohama (JP)

(73) Assignee: Panasonic Communications Co., Ltd., Tokyo (JP)

( * ) Notice: Subject to any disclaimer, the term of this patent is extended or adjusted under 35 U.S.C. 154(b) by 641 days.

(21) Appl. No.: 09/725,127

(22) Filed: Nov. 29, 2000

(65) Prior Publication Data
US 2002/0051168 A1 May 2, 2002

(30) Foreign Application Priority Data
Jun. 7, 2000 (JP) .................................. 2000-170039

(51) Int. Cl.[7] .............................................. G06K 1/00
(52) U.S. Cl. ..................... 358/1.15; 358/505; 358/523; 358/400; 358/435; 379/100.09
(58) Field of Search ............................. 358/1.15, 505, 358/523, 400, 435, 440, 474, 402, 408, 407; 379/100.09

(56) References Cited

U.S. PATENT DOCUMENTS

| | | | | |
|---|---|---|---|---|
| 5,845,057 A | * | 12/1998 | Takeda et al. ............. | 358/1.15 |
| 6,094,277 A | * | 7/2000 | Toyoda ..................... | 358/1.15 |
| 6,137,586 A | * | 10/2000 | Kato ......................... | 358/1.14 |
| 6,301,016 B1 | * | 10/2001 | Matsueda et al. .......... | 358/407 |
| 6,507,414 B1 | * | 1/2003 | Yoshida .................... | 358/407 |
| 6,614,548 B1 | * | 9/2003 | Kisono ...................... | 358/1.15 |

* cited by examiner

Primary Examiner—Kimberly Williams
Assistant Examiner—Negussie Worku
(74) Attorney, Agent, or Firm—Greenblum & Bernstein, P.L.C.

(57) ABSTRACT

In a facsimile system adapted to receive data via a LAN (Internet facsimile system), when the facsimile machine is unable to print or otherwise process the received data, and has no mass storage device, the received data is rerouted to the other terminal connected to the LAN so that the received data may be readily retrieved at all times. Such a situation can occur as a result of a failure of the printer unit, running out of printing paper, experiencing an unchanged state of the image memory for more than a prescribed time period, experiencing a memory-full state of the image memory for more than a prescribed time period, and detecting the received data to be based on a format which the facsimile system is unable to handle. Therefore, the received data can be made readily available for the interested party, and the safety of the received data can be improved.

16 Claims, 11 Drawing Sheets

Fig. 6

| processing modes | |
|---|---|
| | 1: do nothing |
| | 2: transfer to other IFAX |
| | 3: transfer to admin PC |
| | 4: transfer to POP server |

| IFAX mail address |
|---|
| ifax11@aaa.bbb.co.jp |

| admin PC mail address |
|---|
| kanri@aaa.bbb.co.jp |

| own mail address |
|---|
| myifax@aaa.bbb.co.jp |

INTERNET FACSIMILE SYSTEM

TECHNICAL FIELD

The present invention relates to a facsimile system which is generally called as "Internet facsimile" and adapted to receive data via a LAN or the Internet, and in particular to such a facsimile system which can successfully receive data even when the facsimile is unable to print or otherwise properly process the received data.

BACKGROUND OF THE INVENTION

The Internet facsimile system is known. For instance, U.S. Pat. No. 6,094,277 issued Jul. 25, 2000 to Toyoda et al. discloses an Internet facsimile system which changes the image data into corresponding mail data for transmission over the Internet. The Internet mail typically uses the SMTP (simple mail transfer protocol). According to this protocol, the communication terminal accesses a mail server at a regular interval, and retrieves mail directed to the particular communication terminal by matching the user name and password with the data stored in the mail server. The communication terminal typically consists of a personal computer or workstation, and such a terminal can retrieve the entire mail and display it on the monitor as it is normally equipped with a mass storage device such as a hard disk.

On the other hand, an Internet facsimile machine is not normally equipped with any such mass storage devices or large memory. Because the retrieved mail data is simply printed on paper concurrently with retrieving mail data from the mail server, there is no need to store any large amount of mail data under normal circumstances. However, if the printer should fail, the facsimile machine would not be able to retrieve mail data from the mail server, and any further receipt of mail or image data would be made impossible.

BRIEF SUMMARY OF THE INVENTION

In view of such problems of the prior art, a primary object of the present invention is to provide a facsimile system adapted to receive data via a LAN (Internet facsimile system) which allows the received data to be retrieved even when the affected facsimile machine is unable to print or otherwise process the received data, and has no mass storage device.

A second object of the present invention is to provide such a facsimile system which allows received data that cannot be processed by the facsimile system to be rerouted to another terminal on the LAN so that the received data may be accessed from the other terminal without substantially modifying the existing system.

A third object of the present invention is to provide such a facsimile system which can prevent loss of the received data or delay in the access to the received data even when the affected facsimile machine is unable to print or otherwise process the received data, and has no mass storage device.

According to the present invention, these and other objects can be accomplished by providing a facsimile device adapted to receive data via a LAN, comprising: a facsimile unit including a printer unit, scanner unit and interface with a public switching telephone network; a CPU incorporated in the facsimile unit; a LAN interface provided in association with the CPU for establishing communication with another terminal via a LAN; data memory storing at least one mail address for rerouting received data; and image memory for storing received data; the CPU being adapted to reroute the received data to the other terminal connected to the LAN under a certain condition of the facsimile device.

The present invention also provides a method for receiving facsimile data in such a facsimile device which comprises the steps of determining if a certain condition of the facsimile device exists or not; and upon determining the existence of the certain condition of the facsimile device, rerouting the received data to the other terminal connected to the LAN.

More specifically, the rerouting step may comprise the sub steps of storing the received data in the buffer memory for each page thereof; if the certain condition of the facsimile device does not exist, transferring the image data stored in the buffer memory to the image memory page by page; and if the certain condition of the facsimile device exists, converting the image data stored in the buffer memory into mail data and transferring the mail data to the other terminal connected to the LAN page by page.

Thus, even when the facsimile device is unable to print the received data for any one of a number of possible reasons, the data can be simply rerouted to another terminal, and the received data can be readily accessed from the other terminal, and the possibility of losing the received data can be eliminated. The LAN as used herein includes the Internet or other intranet system, and the mode of linking with such systems may include various modes of LAN connection including Ethernet, and dialup connections among other possibilities.

The received data may include G3 facsimile data received via a public switching telephone network, facsimile data based on a prescribed protocol and received via the LAN, and email data based on a prescribed protocol and received via the LAN. The data which is stored in the image memory and is not yet printed may also be an object to be rerouted to another terminal. This is important because the situation where the data is kept in volatile memory for a prolonged time period can be avoided, and the possibility of losing the data due to the power outage of the facsimile device can be minimized.

The certain condition of the facsimile device may include a failure of the printer unit, running out of printing paper, experiencing an unchanged state of the image memory for more than a prescribed time period, experiencing a memory-full state of the image memory for more than a prescribed time period, and detecting the received data to be based on a format which the facsimile device is unable to handle. The other terminal connected to the LAN may include a personal computer, a server and another facsimile device adapted to receive data via a LAN.

According to a certain aspect of the present invention, there is provided an internet facsimile device, comprising: image memory for storing image data received by a facsimile reception or a mail reception; a control unit including means for detecting a memory full state of the buffer memory; the control unit being adapted to transfer data stored in the image memory to a server when the image memory is detected to be full.

According to another aspect of the present invention, it may also be defined as an internet facsimile device, comprising: buffer memory for storing image data received by a facsimile reception or a mail reception via SMTP protocol page by page; image memory for storing the image data transferred from the buffer memory; and a control unit for storing the received image data in the buffer memory, converting the image data into mail data, and transferring the converted mail data to another terminal connected to the internet facsimile via a LAN, page by page, when the image memory is detected to be full.

BRIEF DESCRIPTION OF THE DRAWINGS

Now the present invention is described in the following with reference to the appended drawings, in which:

FIG. 6 is a diagram showing the contents of the data memory;

DETAILED DESCRIPTION OF THE PREFERRED EMBODIMENTS

Figure 1:
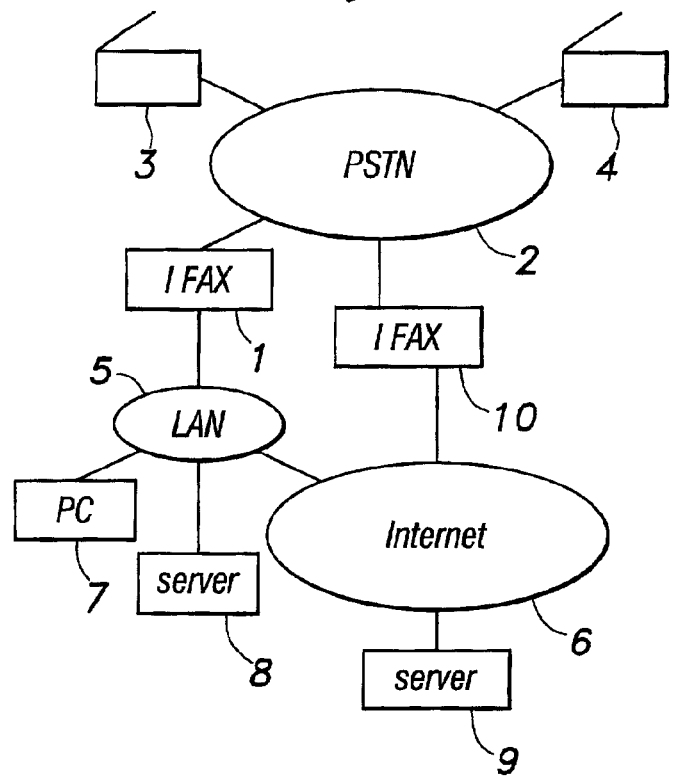
FIG. 1 is a block diagram of a network environment in which a facsimile device embodying the present invention is implemented.

FIG. 1 schematically illustrates a system environment in which an internet facsimile system embodying the present invention is implemented. An internet facsimile machine (IFAX) 1 is placed in a public switching telephone network (PSTN) 2, and can communicate with any one of a number of remote G3 facsimile machines (G3FAX) 3 and 4 via PSTN 2. IFAX 1 is also connected to a local area network (LAN) 5 which is in turn connected to the Internet 6 via a gateway (not shown in the drawing). A number of workstations, personal computers and servers are connected to LAN 5, and they are represented by an administrator personal computer (PC) and a POP3 mail server in the drawing. The internet facsimile machine embodying the present invention may be directly connected to the Internet 6 or LAN 5 in addition to PSTN 2 as represented by IFAX 10 which is connected to both the Internet 6 and PSTN 2. Numeral 9 denotes a server representing various types of terminals and servers that are connected to the Internet 6.

Figure 2:
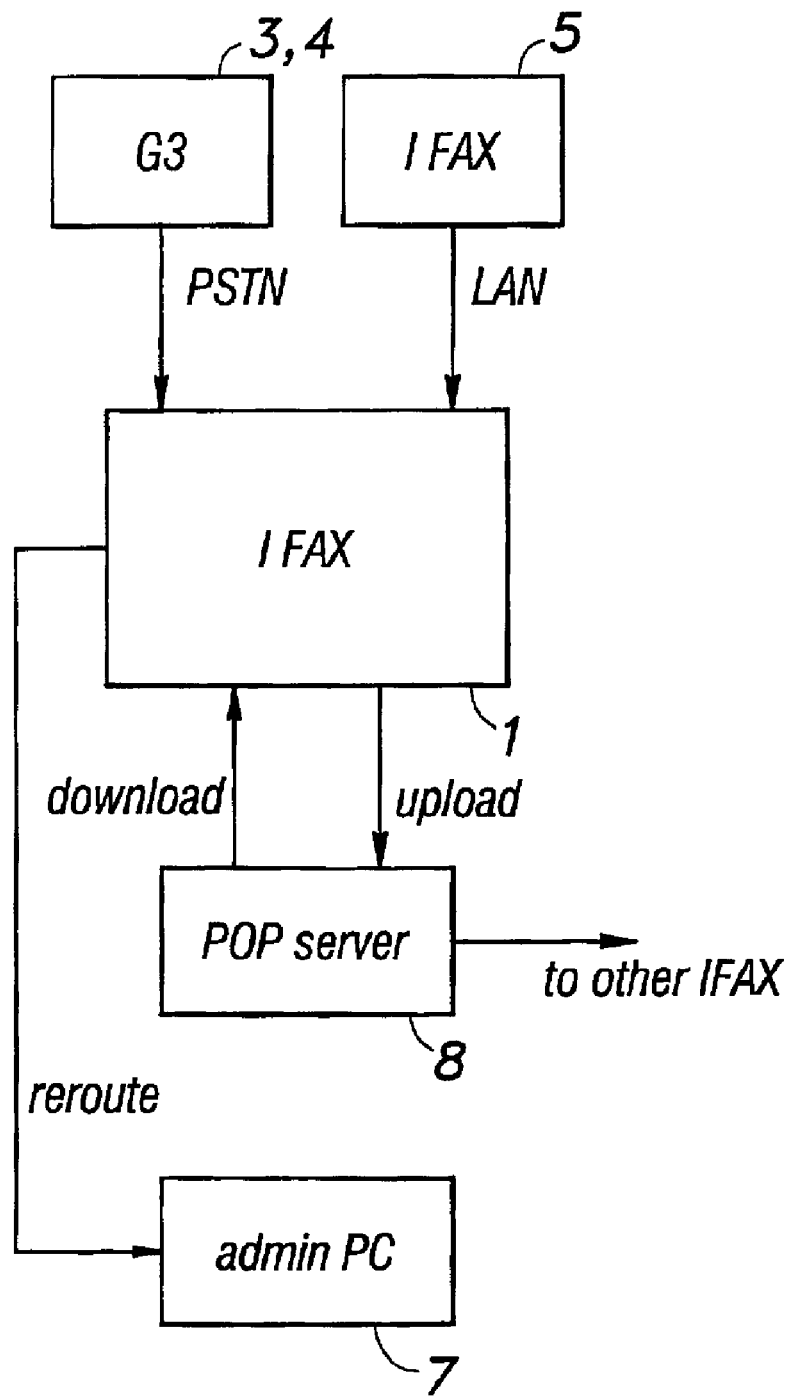
FIG. 2 is a block diagram showing the flow of data to and from the facsimile device according to the present invention.

FIG. 2 schematically illustrates the various channels of communication for IFAX 1. The communication with G3FAX 3 or 4 can be accomplished by using the widely used G3 format for facsimile transmission. IFAX 1 can communicate with other IFAXs on LAN 5 or the Internet 6 by using the STMP (Simple Mail Transfer Protocol) as represented by IFAX 10.

Typically, IFAX 1 is not provided with any mass storage system. Therefore, it IFAX 1 is unable to print the data or file which is forwarded thereto for any one of a number of possible reasons, either the sender experiences a transmission failure or the transmitted data is left in a mail server that may not be readily accessible for the recipient. This can occur when the printer of IFAX 1 has failed, when the memory of IFAX 1 has become full, and when the received file is not a TIFF file.

To avoid this problem, IFAX 1 according to the present invention is adapted to transfer the received file to POP server 8. If desired, the received file may be transferred to administrator PC 7, or other IFAX 10. Once the problem with IFAX 1 has been corrected, and IFAX 1 has become capable of printing or otherwise processing the received file, the received file is retrieved from POP server 6 and printed at IFAX 1. If the received file is not a TIFF file, it is rerouted to administrator PC 7 to be printed, displayed or otherwise processed at administrator PC 7.

Figure 3:
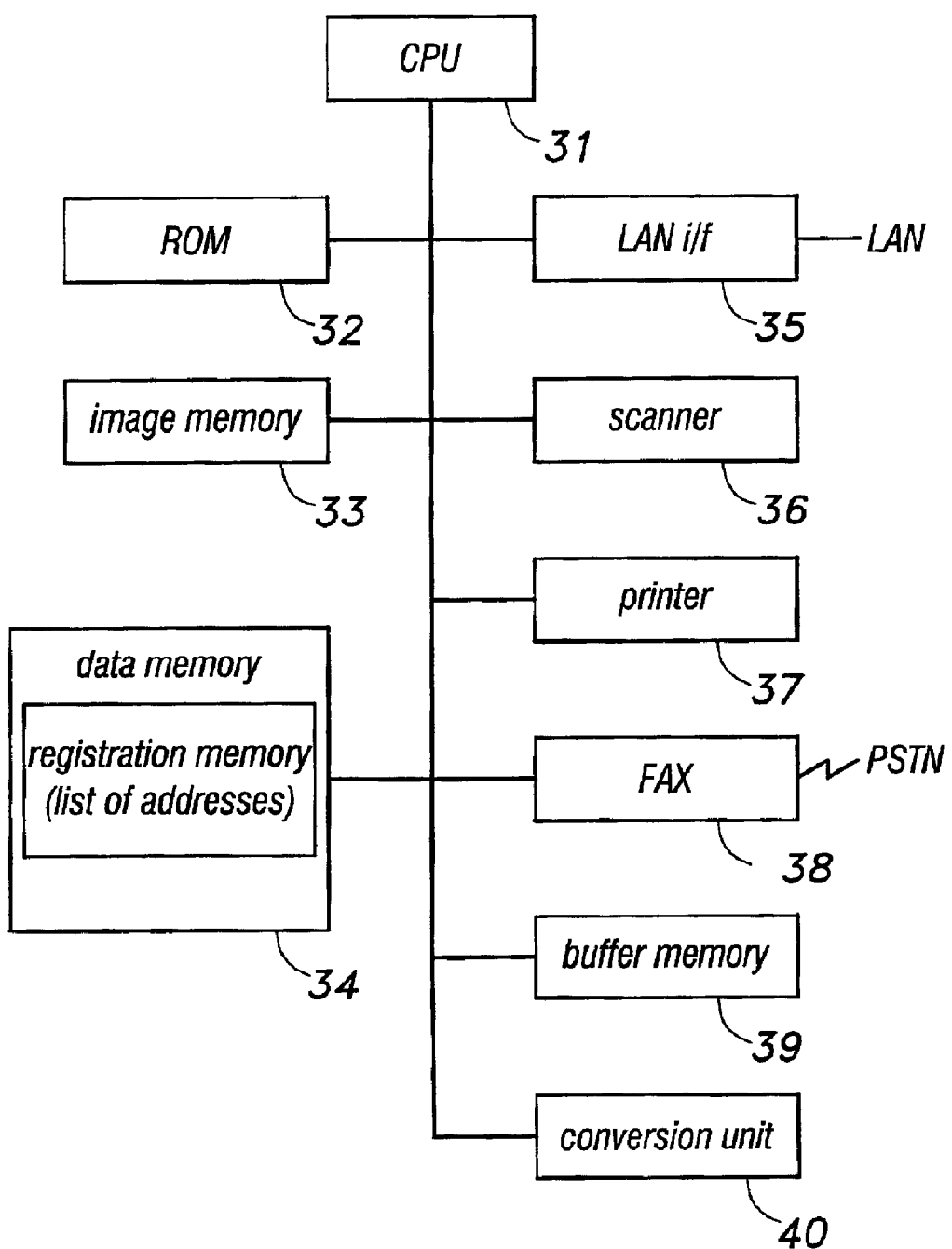
FIG. 3 is a block diagram showing the internal structure of the facsimile device.

FIG. 3 shows the internal structure of IFAX 1 which includes a CPU 31. CPU 31 is connected, via a bus line, to ROM 32, image memory 33, data memory 34, a LAN interface 35, a scanner unit 36, a printer unit 37, a fax unit 38 which serves as an interface with PSTN 2, buffer memory 39 and a conversion unit 39.

Figure 4:
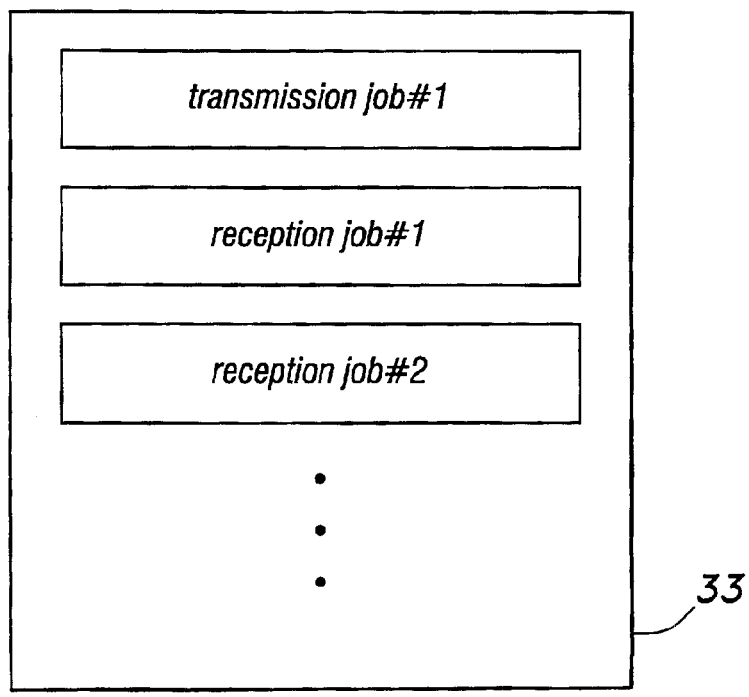
FIG. 4 is a diagram showing the contents of the image memory.

The CPU 31 controls the various functions of IFAX 1 according to the program stored in ROM 32. Received data and data which is to be transmitted are stored in image memory 33 as reception jobs and transmission jobs in different blocks of image memory 33 (see FIG. 4). Data memory 34 stores administrative information on the data stored in image memory 33 such as the registered mail addresses and telephone numbers, and the procedure for transferring files when IFAX 1 is unable to print the received files.

LAN interface 35 interfaces IFAX 1 with LAN 5 and the Internet 6, and is adapted to establish a communication with administrator PC 7 and POP server 8. Scanner unit 36 reads character and image information from an original sheet, and printer unit 37 prints the received file. Fax unit 38 enables IFAX 1 to communicate with other facsimile machines (which may be either G3 or internet facsimile machines).

Figure 5:
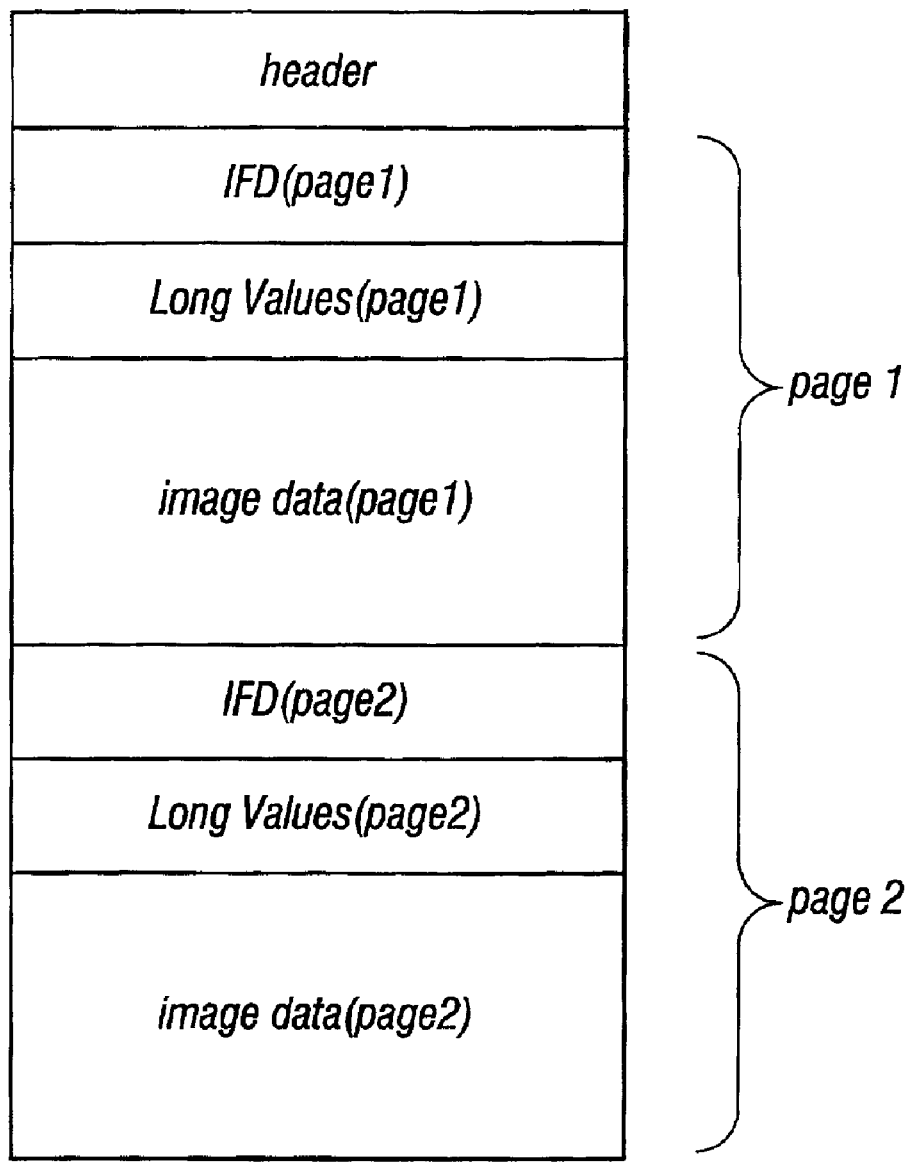
FIG. 5 is a diagram showing the format of a TIFF file which is suitable for transferring facsimile data via the LAN.

Buffer memory 39 temporarily stores the received file before printing it or transferring it to administrator PC 7 or server 8. When the received file is required to be transferred to administrator PC 7 or server 8 via LAN 5 or the Internet 6, and is not a TIFF file, the received file is converted into a TIFF file by conversion unit 39. FIG. 5 shows the structure of a TIFF file which includes a header and a number of pages. Each page consists of an IFD, long values and image data.

FIG. 6 shows the contents of data memory 34. The processing modes consist of a list of possible processing modes that can be selected. Depending on the particular situation, the system may (1) do nothing, (2) transfer data to another IFAX, (3) transfer data to administrator PC, or (4) transfer data to POP server. The selection is typically made by the user or a system administrator as a part of the initial setting process for the particular IFAX. Data memory 34 additionally stores the mail addresses of other IFAX, administrator PC and POP server as well as its own address. The received data may consist of G3 facsimile data, email data or other data of undefined format. If the received data consists of G3 facsimile data (TIFF data), the program flow advances to the flowchart shown in FIGS. 7 and 8. Otherwise, the program flow advances to the flowchart shown in FIGS. 9 and 10.

Figure 7:
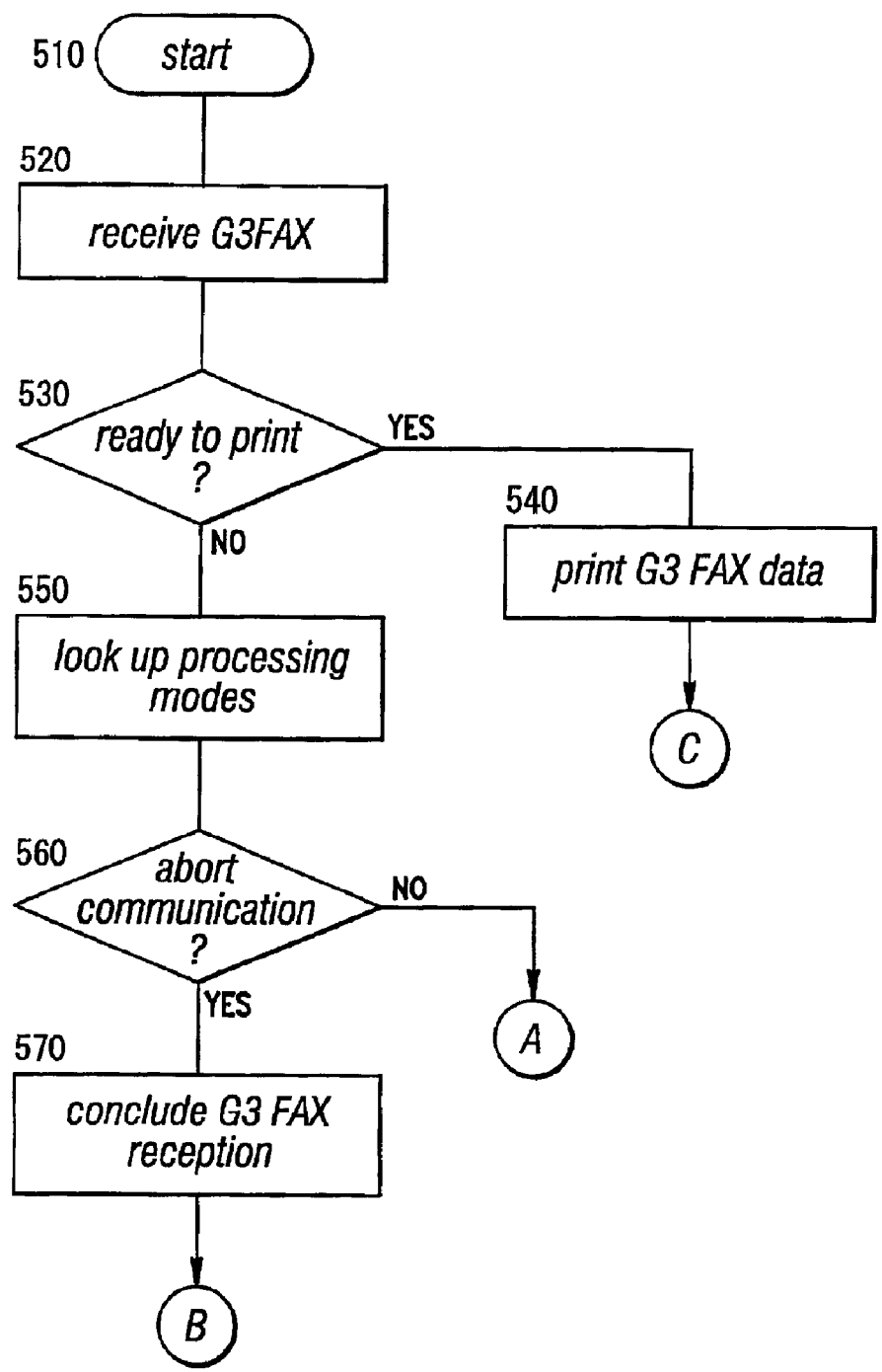
FIGS. 7 and 8 show a flowchart of the process of rerouting G3 FAX data.
Figure 8:
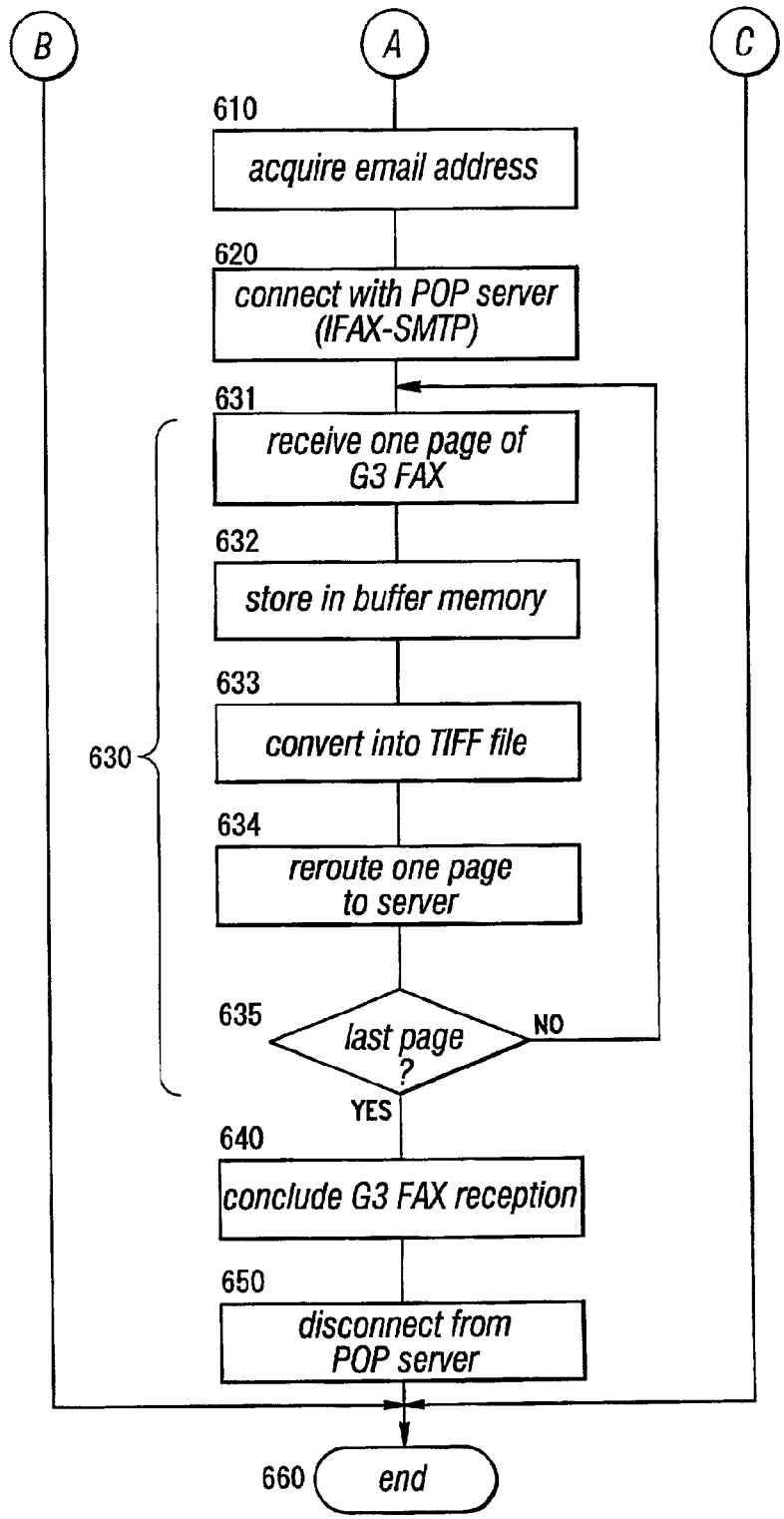

The control flow in case of a printer failure or memory full (in receiving G3 FAX data) of IFAX 1 is described in the following with reference to FIGS. 7 and 8. As soon as the system operation starts (step 510), the system waits for reception of G3 fax data from other facsimile machines and IFAX machines (which emulate normal G3 facsimile machines) via PSTN (step 520). When any G3 data intended for this particular IFAX 1 is detected, it is determined if IFAX 1 is in proper order for receiving and printing the G3 facsimile data (step 530). If IFAX 1 is ready to receive and print the data, the data is received and printed by printer unit 37 (step 540), and this particular control process is concluded (step 660).

If IFAX 1 is not ready to receive the data and is unable to print the received data, the program flow advances to step 550 to look up the processing mode selected from data memory 34. This situation can occur when printer unit 37 fails or runs out of paper, when IFAX 1 is transmitting data, and when the image memory is full. If "do nothing" is selected, the G3 facsimile data reception process is aborted (step 560), and after completing the reception process (step 570), the system flow advances to step 660.

If the system is pre-programmed to transfer the received data to another IFAX, administrator PC or POP server under such a condition, the system retrieves the email address from data memory 34 (step 610). FIG. 8 shows the case where the received data is transferred to POP server 8. If administrator PC 7 or other IFAX 10 is selected, the program flow is essentially the same except for that POP server 8 is replaced by administrator PC 7 or other IFAX 10 as the case may be. In any case, IFAX 1 establishes a connection with POP server 8 (step 620), and conducts a G3 fax data reception process (step 630).

The G3 fax data reception process includes the steps of receiving one page of data via FAX unit 38 (step 631), storing the one page data in buffer memory 39 (step 632), converting the data stored in buffer memory 39 into TIFF data with conversion unit 40 (step 633), and transmitting the TIFF data to POP server 8 via LAN interface 35 (step 634). It is then determined if the received data is the last page or not (step 635). The steps 631 to 635 are repeated until the last page is reached.

When the last page is reached in step 635, the G3 fax data reception process is concluded by executing a G3 fax reception ending step (step 640). The connection with POP server 8 is then shut off (step 650), and the program flow advances to step 660.

Figure 9:
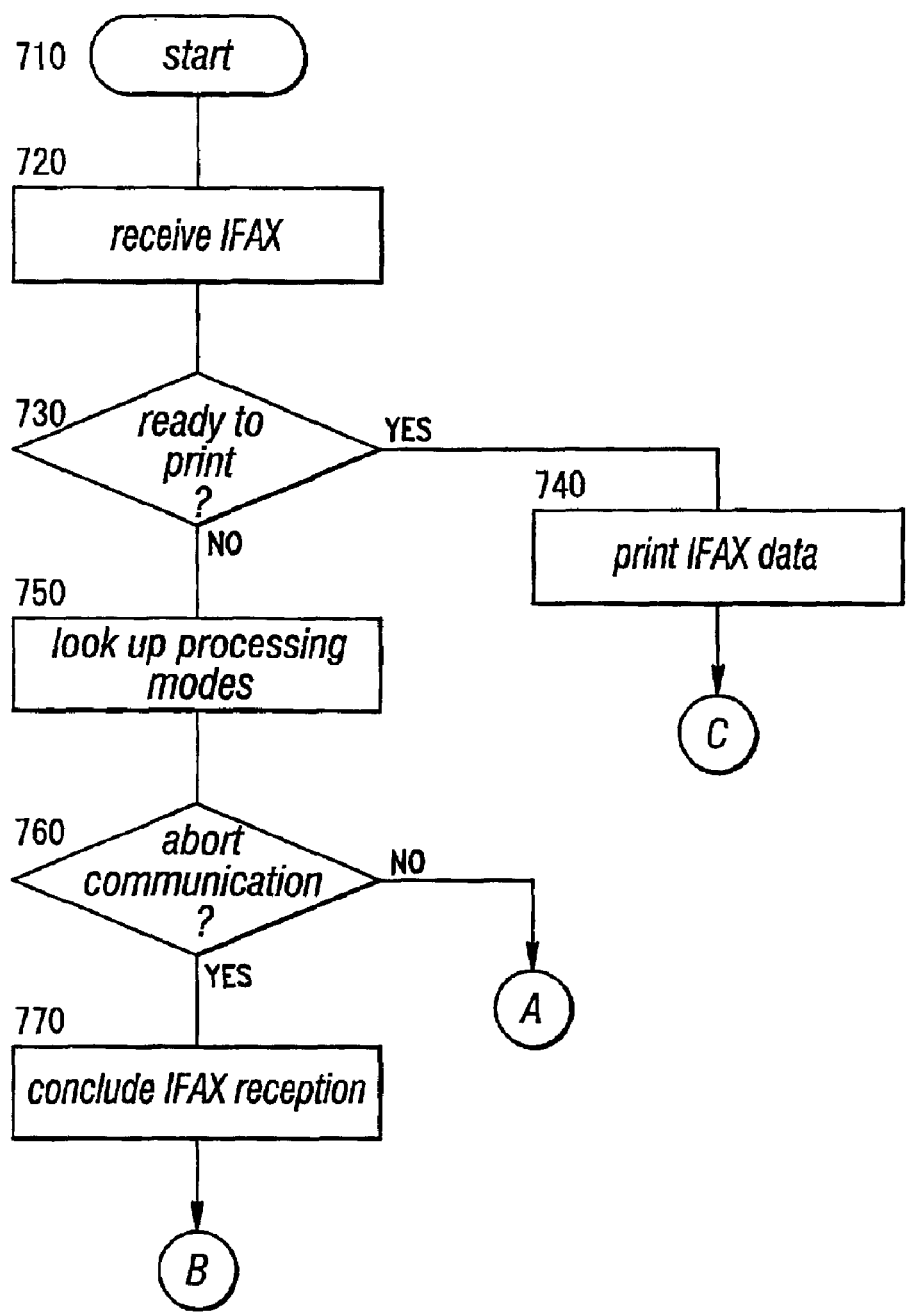
FIGS. 9 and 10 show a flowchart of the process of rerouting IFAX data.
Figure 10:
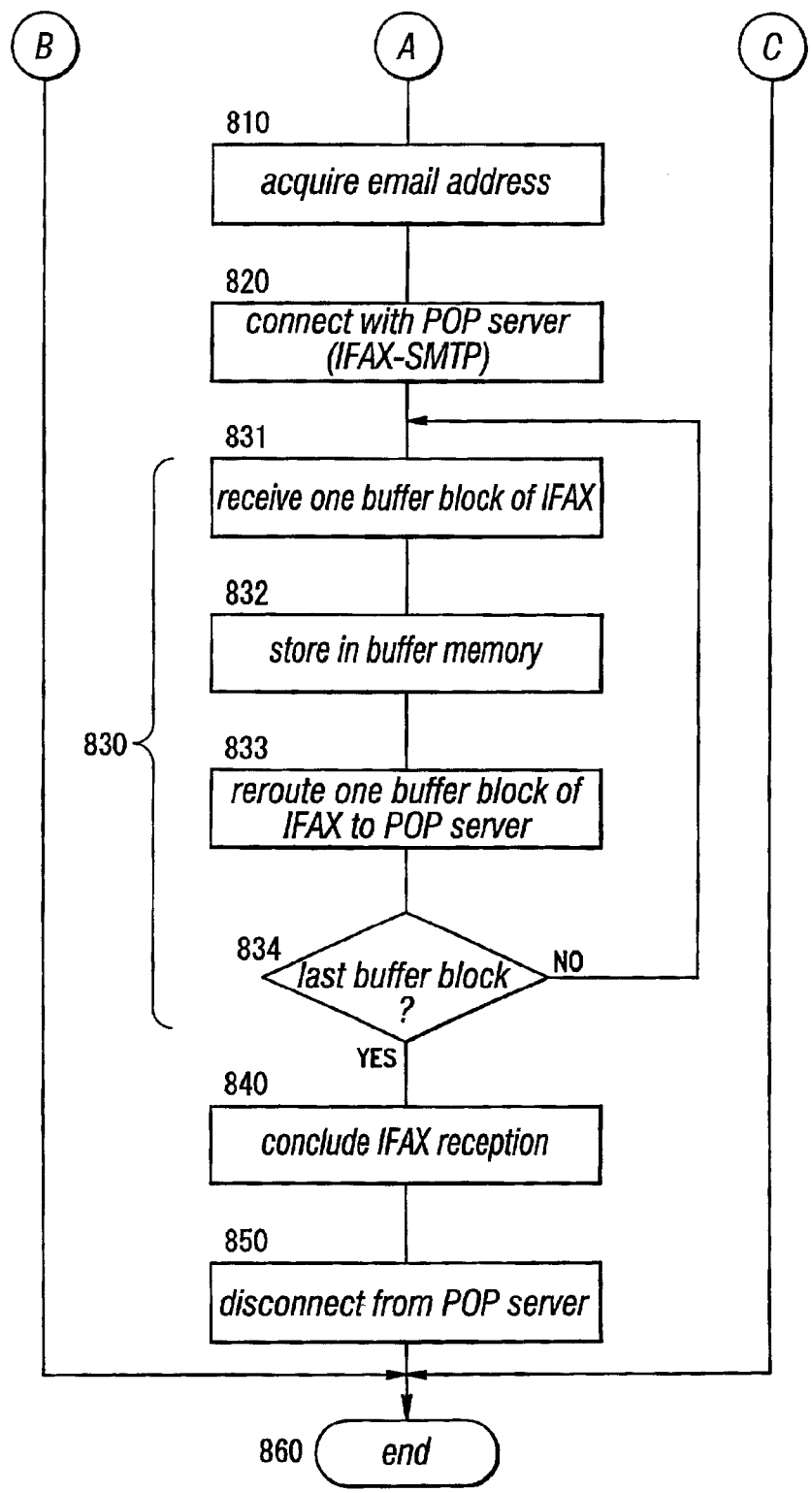

The control flow in case of receiving non-TIFF data or a memory full situation (in case of SMTP data reception) is described in the following with reference to FIGS. 9 and 10. As soon as the system operation starts (step 710), the system waits for reception of data from other IFAX 10 based on the SMTP protocol via LAN 5 or the Internet 6 (step 720). If IFAX 1 is ready to receive and print the data (step 730), the received data is printed (step 740), and the program flow advances to step 860.

If it is determined in step 730 that IFAX 1 is incapable of printing the received data, the system looks for the selected processing mode in data memory 34. This situation can occur when printer unit 37 fails or runs out of paper, when IFAX 1 is transmitting data, and when image memory 33 is full. If the instruction given in data memory 34 is "do nothing", the program flow advances to step 770 to abort the process of receiving the IFAX data. Otherwise, the program flow advances to step 810 shown in FIG. 10. In step 810, one of the rerouting addresses is acquired from the list in data memory 34 according to the initial setting (step 750), and the process of receiving and rerouting the IFAX data is conducted (step 830).

The process of receiving and rerouting the IFAX data is conducted as described in the following. IFAX 1 first receives a block of the IFAX data via LAN interface 35 (step 831). The size of this block corresponds to the size of the available buffer memory. The received IFAX data is temporarily received in buffer memory 39 (step 832), and forwarded to POP server 8 via LAN interface 35 (step 833).

It is then determined if the final page has been reached (step 834). Until the final page is reached, steps 834, 831, 832, 833 and 834 are repeated. In this manner, the received data is entirely rerouted to POP server 8 according to the initial selection, by the SMTP. It is also possible to select the other IFAX 10 or administrator PC 7 as the alternate destination of rerouting. When the final page is reached (step 834), the program flow advances to step 840 to conclude the IFAX communication process. The connection with POP server 8 is shut off in step 850, and this concludes this particular routine (step 860).

Figure 11:
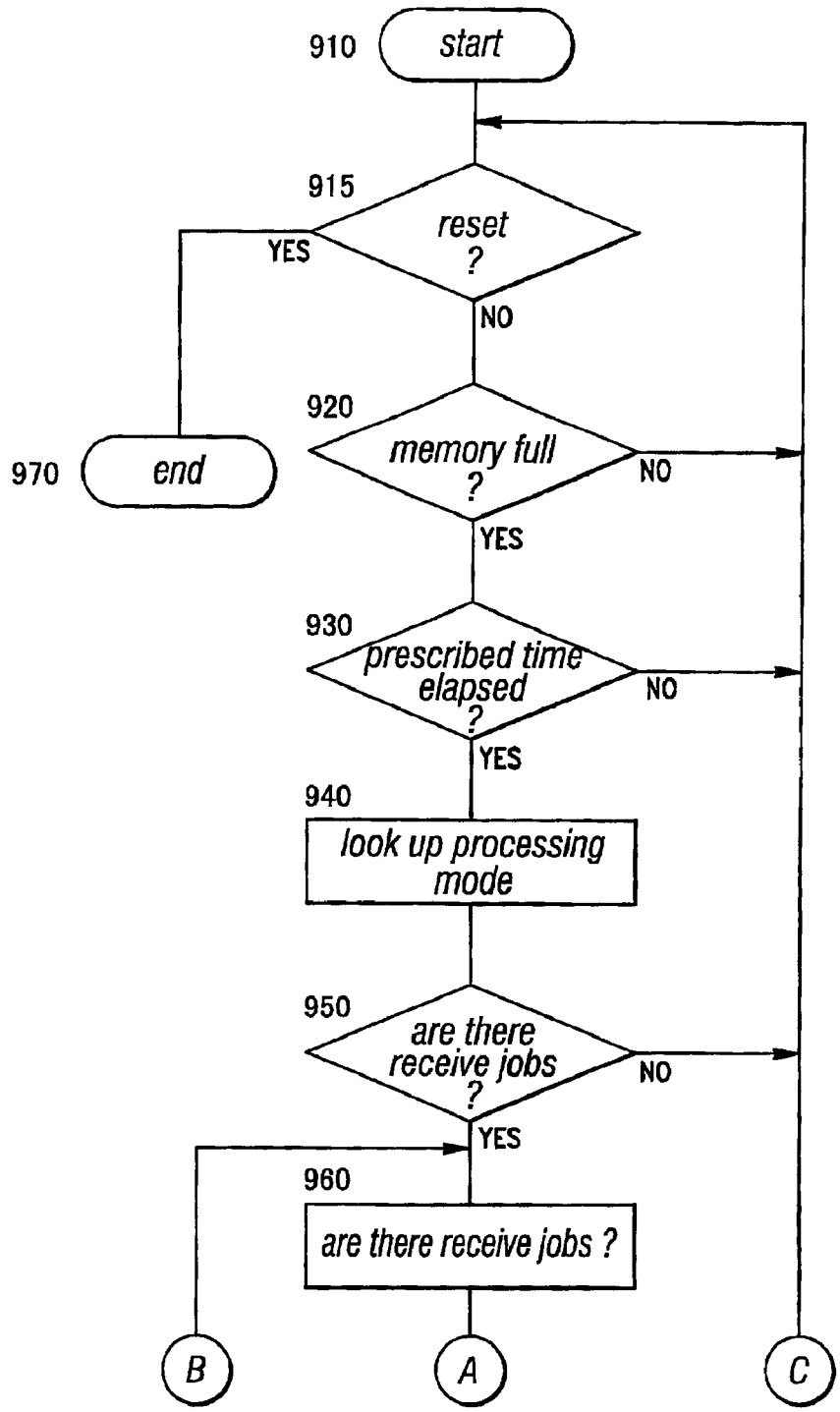
FIGS. 11 and 12 show a flowchart of the process of transferring received data stored in the image memory of the facsimile device to another terminal on the LAN.
Figure 12:
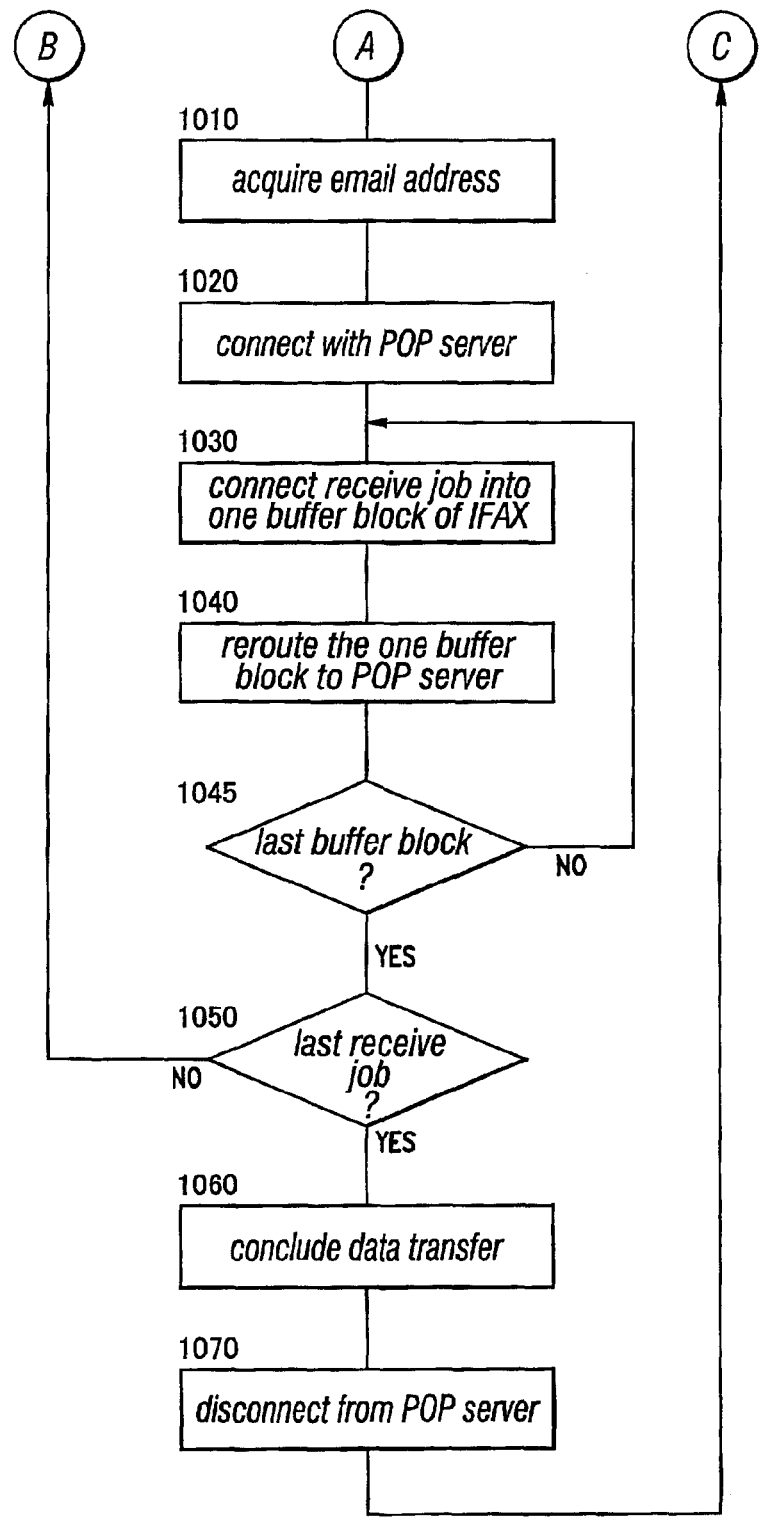

Now is described the process which is executed when the image memory continues to be full for more than a prescribed time period with reference to FIGS. 11 and 12. This process is selected, for instance, when the data in the image memory would not decrease for a prescribed time period typically due to the failure of the printer unit. The data in the image memory could be lost if the data in IFAX 1 is turned off or experiences a power outage.

As the process is started (step 910), it is determined if this process has been reset or not in step 915. If the process is reset, the program flow advances to step 970 to conclude this process. If not, the program flow advances to step 920. In step 920, it is determined if the image memory is full or not. If not, the program flow advances to step 915. It is determined in step 930 if the memory has continued to be full for more than a prescribed time period. If so, the program flow advances to step 940. If not, the program flow returns to step 915. Thus, as long as the image memory continues to be full for more than a prescribed time period (steps 920 and 930), and the process is not reset in step 915, steps 930, 915, 920 and 930 are repeated.

The pre-selected processing mode is acquired from data memory 34 in step 940. In this case, "do nothing" cannot be acquired. It is determined in step 950 if there is any received jobs among the jobs stored in image memory 33. If there is any received job, the program flow advances to step 960. If not, the program flow advances to step 915, and as long as the process is not reset in step 915, steps 950, 915, 920, 930, 940 and 950 are repeated until a received job is detected in step 950. If there are any received jobs, one of the received jobs stored in the image memory is selected in step 960.

One of the rerouting addresses is acquired in step 1010, and a connection is established with POP server 8 according to this address in step 1020. A block of the selected received job is converted into a TIFF file at conversion unit 40 in step 1030, and the TIFF file corresponding to this block of the buffer memory is forwarded to POP server 8 via LAN interface 35. If the buffer block transmitted in step 1040 is the final block (step 1045), the program flow advances to step 1050. If not, the steps 1045, 1030, 1040 and 1045 are repeated until the final buffer block is detected in step 1045.

When the program flow has advanced from step 1045 to step 1050, all of the buffer blocks of the single received job have been process. It is determined in step 1050 if the received job which has been transmitted is the last received job or not. If it is the last received job, the program flow advances to step 1060 to conclude this process. If not, the program flow advances to step 960, and steps 1050, 960, 1010, 1020, 1030, 1040, 1045 and 1050 are repeated until the transmitted job is determined to be the last received job. When the program flow has advanced from step 1050 to step 1060, all of the received jobs have been transmitted or rerouted.

A data transmission is concluded in step 1060, and IFAX 1 is disconnected from POP server 8 in step 1070. The program flow then advances to step 925, and if the process has been reset, the program flow advances to step 970 to conclude this process.

Although the present invention has been described in terms of a preferred embodiment thereof, it is obvious to a person skilled in the art that various alterations and modifications are possible without departing from the scope of the present invention which is set forth in the appended claims.

What is claimed is:

1. A facsimile device comprising:

a LAN interface configured to connect to another device via a LAN;

a receiver configured to receive image data via a PSTN;

a memory configured to store the received image data;

a printer configured to print the image data stored in the memory;

a controller configured to control printing of the stored image data by the printer;

the controller, when the memory is full and the memory continues to be full for a predetermined time, being configured to convert the image data stored in the memory into data configured for an Internet transmission, and to transfer the converted data to the another device via the LAN interface.

2. The facsimile device according to claim 1, wherein the another device comprises a server connected to the facsimile device via the LAN interface.

3. The facsimile device according to claim 2, wherein the server transfers the converted data to another facsimile device.

4. The facsimile device according to claim 2, wherein the server stores the converted data, and the controller retrieves the converted data from the server when the memory has space to store the converted data.

5. The facsimile device according to claim 1, wherein the another device comprises a personal computer connected to the facsimile device via the LAN interface, the personal computer managing a system including the facsimile device.

6. The facsimile device according to claim 1, the memory further storing an e-mail address of the another device, wherein the controller obtains the e-mail address of the another device from the memory, connects with the another device, and transfers the converted data to the another device.

7. The facsimile device according to claim 1, wherein the controller stores the image data received via the receiver in the memory, even if the memory is full, when the memory does not continue to be full for a predetermined time.

8. A facsimile device comprising:

a LAN interface configured to connect to a LAN and to receive data via the LAN, the LAN interface being connected to another device via the LAN;

a memory configured to store the data;

a printer configured to print the data stored in the memory;

a controller configured to control printing of the stored data by the printer;

the controller, when the memory is full and the memory continues to be full for a predetermined time, being configured to transfer the data stored in the memory to the another device via the LAN interface.

9. The facsimile device according to claim 8, wherein the another device comprises a server connected to the facsimile device via the LAN interface.

10. The facsimile device according to claim 9, wherein the server transfers the converted data to another facsimile device.

11. The facsimile device according to claim 8, wherein the server stores the converted data, and the controller retrieves the converted data from the server when the memory has space to store the converted data.

12. The facsimile device according to claim 8, wherein the another device comprises a personal computer connected to the facsimile device via the LAN interface, the personal computer managing a system including the facsimile device.

13. The facsimile device according to claim the 8, memory storing an e-mail address of the another device, wherein the controller obtains the e-mail address of the another device from the memory, connects with the another device, and transfers the stored data to the another device.

14. The facsimile device according to claim 8, wherein the controller stores the data received via the LAN interface in the memory, even if the memory is full, when the memory does not continue to be full for a predetermined time.

15. A method for receiving image data in a facsimile device , the facsimile device being connected to another device via a LAN, the method comprising:

receiving image data via a PSTN;

storing the received image data in a memory;

printing the stored image data;

converting, when the memory is full and the memory continues to be full for a predetermined time, the stored image data into data for an Internet transmission;

transferring the converted data to the another device via the LAN interface.

16. A method for receiving image data in a facsimile device, the facsimile device being connected to another device via a LAN, the method comprising:

receiving data via the LAN;

storing the received data in a memory;

printing the stored data;

transferring, when the memory is full and the memory continues to be full for a predetermined time, the stored data to the another device via the LAN.

* * * * *

UNITED STATES PATENT AND TRADEMARK OFFICE
CERTIFICATE OF CORRECTION

PATENT NO. : 6,894,798 B2
DATED : May 17, 2005
INVENTOR(S) : S. Yashiki

It is certified that error appears in the above-identified patent and that said Letters Patent is hereby corrected as shown below:

<u>Column 8,</u>
Lines 24-25, change "claim the 8, memory" to -- claim 8, the memory --.

Signed and Sealed this

Twenty-seventh Day of December, 2005

JON W. DUDAS
*Director of the United States Patent and Trademark Office*